(12) United States Patent
Gupte et al.

(10) Patent No.: US 6,370,893 B1
(45) Date of Patent: Apr. 16, 2002

(54) ABSORPTION COOLING SYSTEM WITH REFRIGERANT MANAGEMENT FOR DILUTION AND PART LOAD OPERATION

(75) Inventors: Neelkanth Shridhar Gupte, Liverpool, NY (US); Jin Sang Ryu, Gyeonggi-do (KR)

(73) Assignee: Carrier Corporation, Syracuse, NY (US)

( * ) Notice: Subject to any disclaimer, the term of this patent is extended or adjusted under 35 U.S.C. 154(b) by 0 days.

(21) Appl. No.: 09/741,963

(22) Filed: Dec. 22, 2000

(51) Int. Cl.[7] .............................................. F25B 15/00
(52) U.S. Cl. .......................................... 62/141; 62/476
(58) Field of Search ......................... 62/141, 476, 103, 62/105, 119, 324.2, 148, 498, 487, 335, 489

(56) References Cited

U.S. PATENT DOCUMENTS 4,322,951 A * 4/1982 Alfano ......................... 62/101
5,806,325 A 9/1998 Furukawa et al. ............. 62/103
6,067,807 A * 5/2000 Reimann ...................... 62/141
6,260,364 B1 * 7/2001 Moon et al. ................... 62/141

FOREIGN PATENT DOCUMENTS

JP 54047150 A * 4/1979
JP 11304275 A * 11/1999

* cited by examiner

Primary Examiner—Henry Bennett
Assistant Examiner—Chen-Wen Jiang

(57) ABSTRACT

An absorption provided with a refrigerant management method and apparatus for temporarily storing liquid refrigerant during cooling mode operation and releasing refrigerant to the evaporator sump as needed to prevent refrigerant pump cavitation during periods of part load operation and causing dilution of solution in the absorber when the system is shut down. The refrigerant is stored in a tank located in the evaporator, with the tank fluidly communicating with the evaporator sump both by way of a side opening in the tank and by way of overflowing the tank. Refrigerant replenishment to the tank occurs during normal operation either by refrigerant flow from the condenser or by way of a bleed line from the refrigerant pump.

18 Claims, 3 Drawing Sheets

ABSORPTION COOLING SYSTEM WITH REFRIGERANT MANAGEMENT FOR DILUTION AND PART LOAD OPERATION

BACKGROUND OF THE INVENTION

This invention relates generally to absorption cooling systems and to absorption heating and cooling systems and, in particular, to the management of refrigerant for release into the system during part load and shut down conditions.

In an absorption type cooling system, an absorbent is dissolved in a liquid refrigerant to produce a refrigerant-absorbent solution that is suitable for use in the process. When such a system operates under cooling loads that vary, the amount of refrigerant necessary to keep the system running efficiently will also vary. As a result, it is a common practice to equip such a cooling system with a refrigerant adjusting system which includes a refrigerant storage reservoir, and to store refrigerant in or release refrigerant from this reservoir as necessary to keep the concentration of the solution within an acceptable range of concentrations as the cooling load fluctuates. This storage reservoir often takes the form of a sump that is located in or in close association with the system condenser.

One example of a cooling mode refrigerant adjusting system of the above-described type is described in unexamined Japanese application 62-178858, which is assigned to Ebara Ltd. of Tokyo, Japan. In the latter application, there is disclosed an absorption machine in which the gravity flow of liquid refrigerant between the system condenser and the system evaporator is controlled in response to a sensed condition of the system, such as the solution temperature as it is leaving the absorber. A reservoir for liquid refrigerant is provided inside the condenser and the refrigerant is supplied to the evaporator through a first flow path under normal operating conditions. Upon the sensing of a condition that calls for an increase in the quantity of refrigerant, a second flow path is opened which supplies additional refrigerant from the condenser to the evaporator. Another example of a refrigerant adjusting system is described in copending U.S. patent application Ser. No. 09/244,910, filed Feb. 4, 1999, which is commonly assigned herewith, and which is hereby expressly incorporated by reference herein. In this application, there is disclosed an absorption type machine in which refrigerant is stored in a holding tank that is separate from the condenser sump and that is filled via a refrigerant bleed line. The desired refrigerant concentration is then maintained by releasing refrigerant from the holding tank under the control of a microprocessor in response to the sensing of a need for additional refrigerant.

An example of a refrigerant adjusting system that is specially adapted for use in an absorption type refrigerator is described in U.S. Pat. No. 5,806,325 (Furukawa et al). In that patent there is described an absorption type refrigerator in which a storage reservoir is formed in the condenser by a dam with an array of holes that allows the rate at which refrigerant is released to vary as a function of the rate at which refrigerant condenses and, consequently, as a function of the cooling load that the refrigerator must support.

When an absorption type cooling system is shut down, it is necessary to release into the system, within a time known as the dilution time, a quantity of refrigerant which is sufficient to dilute or reduce the concentration of the absorbent-refrigerant solution within the absorber to a value low enough to prevent crystals of the absorbent from forming therein. The diluting of this solution during the shut down process is known as the dilution cycle of the system.

Historically, the additional refrigerant necessary to enable the system to complete its dilution cycle has been provided in various ways. One approach was to pump the additional refrigerant from a specially provided storage tank. This approach is not cost effective, however, not only because of the cost of providing such a storage tank, but also because of the cost of providing the associated pump and pump control circuitry.

Another way of providing the additional refrigerant necessary to complete the dilution process has been to release into the system the contents of the refrigerant storage reservoir or tank that is used as a part of its cooling mode refrigerant adjusting system.

This way of diluting the solution, however, has a deficiency that limits its usefulness. This is that the reservoir outlets and piping through which refrigerant is released during the cooling mode refrigerant adjusting process are too small to allow the refrigerant necessary to complete the dilution process to be released within the available dilution time. As a result, the released refrigerant may not be able to mix with the absorbent-refrigerant solution rapidly enough to prevent crystals from forming in the absorber.

While the above-mentioned deficiency may be overcome by providing circuitry which senses the occurrence of a shut down condition, and which opens valves that controllably increase the rate at which refrigerant is released into the evaporator, the provision of such circuitry and valves substantially increases the cost of the shut down portion of the cooling system. The provision of such control circuitry and valves also increases the complexity of the system and thereby introduces failure modes that decrease the overall reliability thereof.

Another approach for providing the refrigerant necessary for dilution has been that shown in U.S. patent application Ser. No. 09/580,182, filed May 26, 2000 which is commonly assigned herewith and which is expressly incorporated herein by reference. There, a refrigerant storage tank is provided in the condenser for storage during the cooling cycle for release along two flow paths during part load and shut down conditions, respectively.

Finally, there is another common approach wherein the refrigerant is stored in the evaporator sump and the level of the refrigerant is sensed so that when it reaches a certain predetermined level, a solenoid valve is opened and refrigerant is dumped to the solution pump either by gravity feed or by using a refrigerant pump. This approach, of course, requires a sensor, a solenoid valve and possibly an additional refrigerant pump.

It is therefore an object of the present invention to provide an improved refrigeration management apparatus for an absorption system.

Another object of the present invention is the provision in an absorption system for a refrigeration management apparatus which stores refrigerant during the cooling process and selectively releases refrigerant to accommodate part load and shutdown conditions.

Yet another object of the present invention is the provision in an absorption system for the storage of refrigerant in a location other than in the condenser.

These objects and other features and advantages become readily apparent upon reference to the following descriptions when taken in conjunction with the appended drawings.

SUMMARY OF THE INVENTION

Briefly, in accordance with one aspect of the invention, a refrigerant storage tank is placed in the evaporator of an absorption system, in fluid communication with both the condenser and an evaporator sump. During cooling mode operation, liquid refrigerant flows from the condenser to the storage tank by way of a conduit, and from the storage tank to the evaporator sump by way of an opening in the side of the storage tank and by way of overflowing the refrigerant tank during full load operating conditions. The size of the opening is such that, under part load conditions, there is sufficient flow of refrigerant to the sump to prevent cavitation of a refrigerant pump associated with the sump. At shutdown, the opening allows for drainage of the refrigerant storage tank into the sump and for the subsequent overflow of the sump into the absorber so as to sufficiently dilute the absorber solution to prevent the formation of crystals.

In accordance with another aspect of the invention, the condenser is fluidly connected to the refrigerant storage tank by way of a J-tube, which provides a liquid seal between the condenser and the evaporator. Also, a liquid/vapor separator may be provided downstream at J-tube such that any vapor that results from a flashing of the refrigerant can be passed to the absorber, with only liquid refrigerant remaining to be passed to the storage tank.

In accordance with another aspect of the invention, the opening in the side of the refrigerant storage tank is a slot which extends vertically to the bottom of the storage tank such that, upon shutdown, the storage tank drains completely to the evaporator sump.

In accordance with another aspect of the invention, the storage tank is replenished by way of a bleed line from the refrigerant pump rather than from the condenser.

In the drawings as hereinafter described, a preferred embodiment is depicted; however, various other modifications and alternate constructions can be made thereto without departing from the true spirit and scope of the invention.

DETAILED DESCRIPTION OF THE INVENTION

Figure 1:
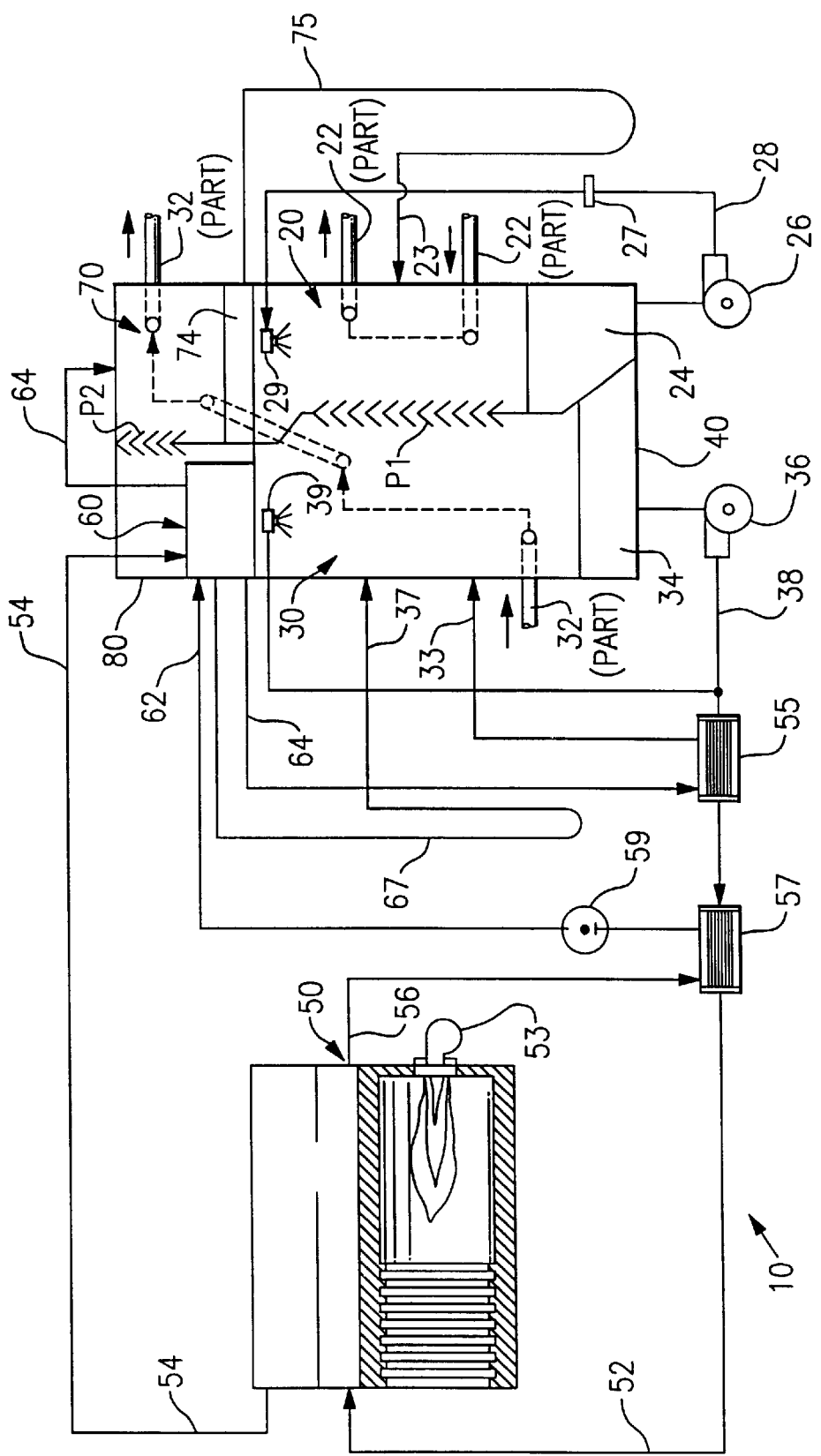
FIG. 1 is a simplified schematic diagram of a two-stage absorption machine of a type which is known in the art.

Referring to FIG. 1, there is shown a simplified schematic diagram of an absorption cooling system 10 of one type that is know in the art, in this case a two-stage, series cycle cooling system. Other types of absorption systems may use more or fewer stages, may be able to operate in both a cooling mode and a heating mode, and may use a parallel rather than a series cycle. It will therefore be understood that the cooling system of FIG. 1 comprises only an exemplary one of the many types of absorption systems that might have been used as a descriptive background for the present invention. As will be explained more fully later, the refrigeration management apparatus of the present invention may be applied to the cooling portions any of these types of absorption systems.

Absorption system 10 of FIG. 1 comprises a closed fluidic system which contains a refrigerant that exists in both a vapor phase and a liquid phase, an absorbent, and a solution of the absorbent in the refrigerant. In the following description, it will be assumed that machine 10 employs water as a refrigerant and lithium bromide, which has a high affinity for water, as an absorbent.

Absorption system 10 of FIG. 1 includes an evaporator 20 and an absorber 30 mounted in a side-by-side relationship within a common shell 40. System 10 also includes a high temperature generator 50 and a low temperature generator 60 for generating refrigerant vapor from the absorbent-refrigerant solution, and condenser 70 for receiving that refrigerant vapor and condensing it to produce liquid refrigerant. Condenser 70 is located immediately adjacent to and above evaporator 20, and is disposed in side-by-side relationship with low temperature generator 60 within a common shell 80.

When system 10 is operating in its cooling mode, liquid refrigerant from condenser 70 is supplied to evaporator 20, where it is vaporized to absorb heat from a fluid, usually water, that is being chilled. The water being chilled is brought through the evaporator through a chilled water line 22 and a heat exchanger assembly, not shown. Vaporized refrigerant developed within evaporator 20 passes to absorber 30, through a partition P1, where it is absorbed by a relatively strong solution to form a relatively weaker solution. Heat developed in the absorption process is taken out of the absorber by cooling water flowing through a cooling water line 32 and a heat exchanger assembly, not shown.

The solution in absorber 30 collects in an absorber sump 34 and is pumped therefrom by a suitable solution pump 36. Part of this solution is recirculated through interior of the absorber through a spray head 39 to enhance the absorption process. The remainder of the solution passes through a first, low temperature solution heat exchanger 55 and a second, high temperature solution heat exchanger 57, and is supplied to high temperature generator 50 via solution inlet line 52 thereof. As the solution within high temperature generator 50 is heated by a suitable heat source 53, refrigerant vapor is driven off and supplied to low temperature generator 60 and condenser 70 through vapor lines 54 and 64. The heated solution remaining within the high temperature generator then exits through a solution outlet line 56 and is supplied to absorber 30 through a solution inlet line 33. On the way, this solution passes through heat exchanger 57, valve orifice 59, low temperature generator 60, via inlet and outlet lines 62 and 64 thereof, and heat exchanger 55 to assure that much of the thermal energy stored therein is recovered, thereby reducing the amount of heat that must be supplied by heat source 53. The machine shown in FIG. 1 may also be provided with an overflow path, which may take the form of a J-tube 67, through which excess solution within low temperature generator 60 may be supplied to absorber 30 through a suitable inlet 37.

Refrigerant vapor which is released into condenser 70 via vapor lines 54 and 64, along with refrigerant vapor which is released into condenser 70 by low temperature generator 60, via a partition P2, is cooled by cooling water flowing through cooling water line 32 and a heat exchanger, not shown. This vapor condenses to form liquid refrigerant which collects in a condenser sump 74. From condenser sump 74, the liquid refrigerant flows toward evaporator 20, under the force of gravity, through a suitable J-tube 75 and refrigerant inlet line 23, and collects within an evaporator sump 24.

Liquid refrigerant is pumped out of evaporator sump by a suitable refrigerant pump 26 and supplied through a refrigerant discharge line 28 and an orifice plate 27 to a spray head 29, which sprays the refrigerant into the interior of the evaporator chamber. There it evaporates as a result of the low pressure maintained therein by absorber 30, through partition P1, to produce the already described cooling effect on fluid, usually water, flowing through chilled water line 22. The refrigerant vapor then passes through partition P1 into the interior of evaporator 30, where it is absorbed by the solution that is pumped from absorber sump 34 by solution pump 36 and sprayed thereover through spray head 39. The solution that collects within absorber sump 34 as this occurs is then either recirculated through spray head 39 or directed back to high temperature generator 50, in the manner described earlier, to complete the cycle.

Because cooling systems of the-above-described type are well known to those skilled in the art, the operation of the system of FIG. 1 in its cooling mode will not be further described herein. Because the manner in which the system of FIG. 1 may be modified for operation in a heating mode is also well known to those skilled in the art, the operation of the system of FIG. 1 in a heating mode will also not be described herein.

When system 10 is operating in its cooling mode, it is desirable for the refrigerant-absorbent solution to have a concentration which is relatively high, i.e., to be relatively strong or refrigerant-poor, but which varies over a range of concentrations that fluctuates with the cooling load thereon. More particularly, it is desirable for the concentration of the solution to increase as the cooling load on the system increases. This increase in concentration is preferably accomplished by providing the cooling system with a cooling mode refrigerant adjusting system that causes liquid refrigerant to be withdrawn from the solution, (i.e., withdrawn from active circulation within the system) as the cooling load increases, and which releases liquid refrigerant into the system as the cooling load decreases.

Figure 2:
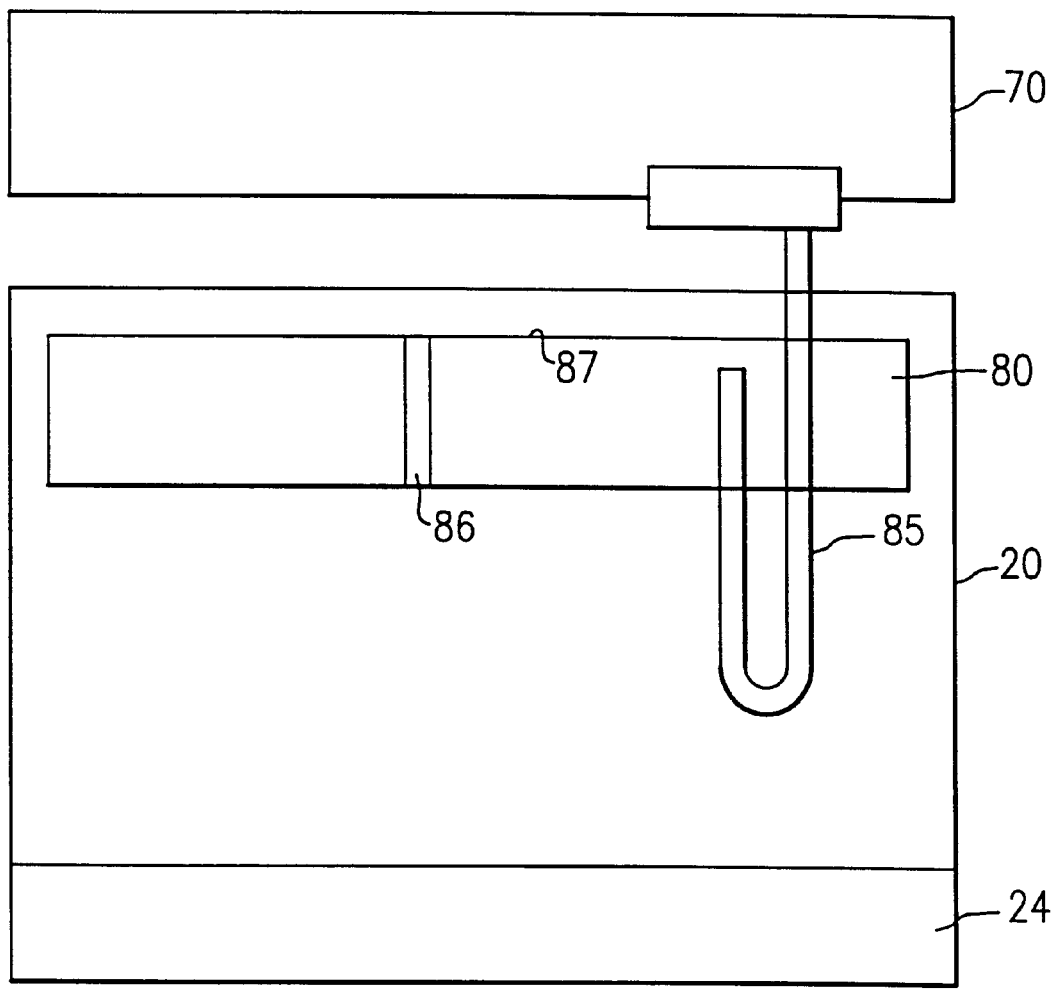
FIG. 2 is a simplified schematic diagram of a refrigerant management apparatus as contemplated by the present invention.
Figure 3:
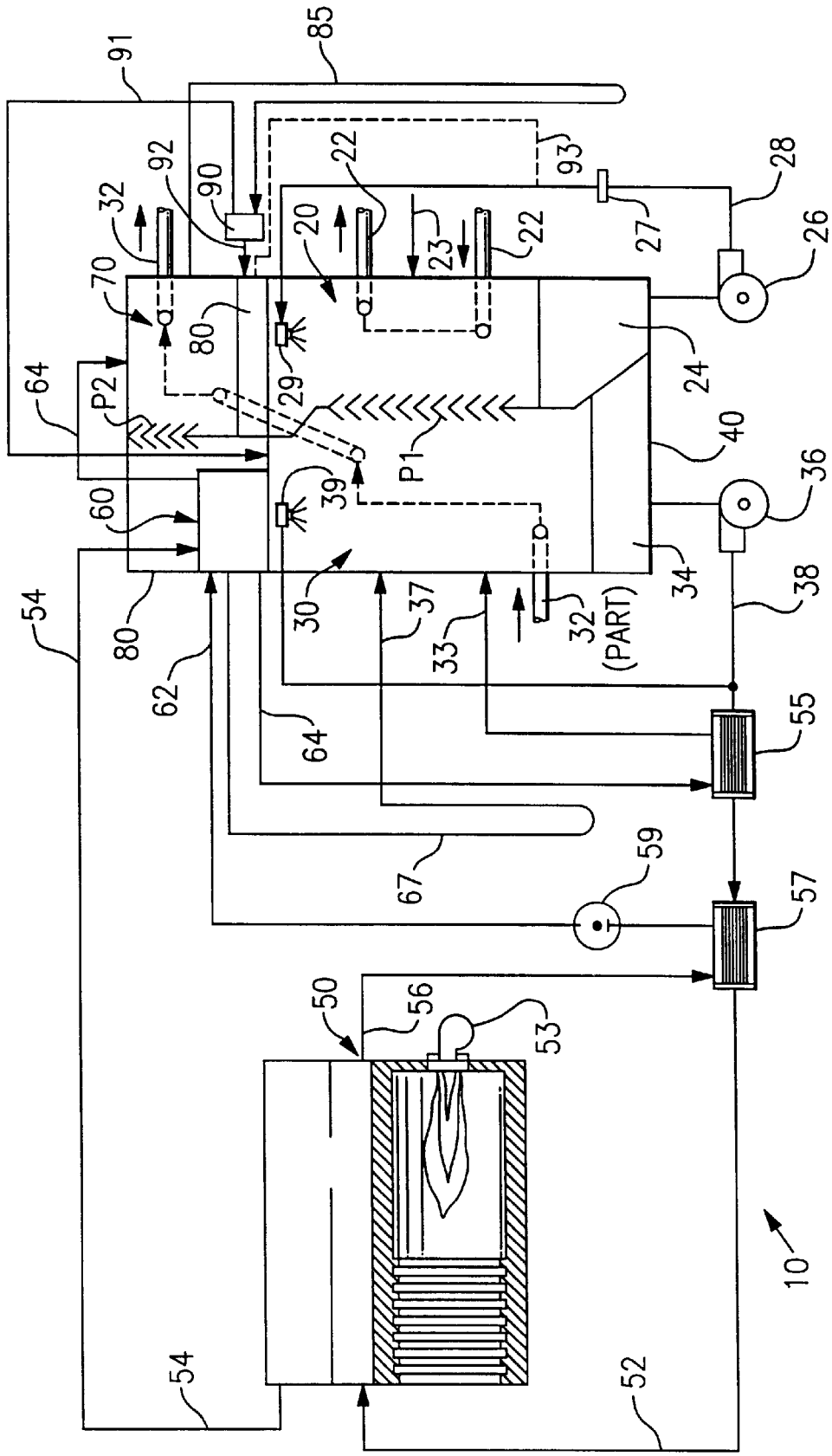
FIG. 3 is a simplified schematic illustration of an absorption machine with a refrigerant management system incorporated therein in accordance with the present invention

In absorption cooling systems of the type described in unexamined Japanese application 62-178858, in U.S. Pat. No. 5,806,325 (Furukawa et al), and in pending application Ser. No. 09/580,182, the refrigerant adjusting system includes a refrigerant storage reservoir that forms a part of the condenser and may comprise the condenser sump. The present invention, on the other hand incorporates the refrigerant management system as a part of the evaporator as shown in FIGS. 2 and 3. Referring now to FIG. 2, there is shown an evaporator 20 with its associated sump 24, along with a condenser 70 mounted thereabove in a conventional manner. However, unlike the conventional machine, there is positioned in the top portion of the evaporator 20, a refrigerant storage tank 80. The condenser 70 and the refrigerant storage tank 80 are interconnected by a J-tube 85 so as to provide for fluidic communication between the two, while maintaining a liquid seal therebetween.

Formed in the side of the refrigerant storage tank 80 is an opening, 86, to provide for direct fluidic flow between the storage tank 80 and the evaporator sump 24 below. While the opening is shown as a vertical slot, it may take any of other appropriate forms such as a single round opening on a plurality of openings arranged in horizontal or vertical spacings. As will be seen, the opening 86 preferably extends downwardly to the bottom surface of the tank 80 so that, so long as there is liquid refrigerant in the storage tank 80, there will be a flow out of a opening 86 and into the evaporator sump 24. The storage tank 80 has an open top 87 so that, if refrigerant continues to flow into the tank 80 by way of the J-tube 85 after it is full, the tank will overflow, with the refrigerant flowing to the evaporator sump 24.

In operation, as refrigerant forms in the condenser, it flows to the storage tank 80 by way of the J- tube 85, but the refrigerant will immediately begin to flow from the slot 86 to the evaporator sump 24. As the machine continues to operate, the volume of condensate coming from the condenser 70 will exceed that which is flowing from the slot 86, so that the storage tank 80 will eventually fill up and overflow to the sump 24. Under part load conditions, however, the supply of condensate from the condenser 70 will not keep up with the flow of refrigerant from the slot 86, and the level of refrigerant in the tank 80 will drop, but the flow of refrigerant from the slot 86 will continue to flow to the sump 24 so as to provide sufficient refrigerant to prevent the cavitation of refrigerant pump 26. At shutdown, all of the refrigerant will be drained from the storage tank 80 by way of the slot 86, thereby filling up the sump 24 and causing it to overflow into the absorber so as to thereby dilute the solution and prevent crystallization from occurring.

As will be understood from the above description, the size of the slot 86, as well as the volumes of the storage tank 80 and the sump 24 are critical to proper operation of the system. Generally, these are selected such that, at the anticipated the minimum load conditions, there is sufficient refrigerant in the sump 24 to prevent cavitation of the refrigerant pump 26, at full load operating conditions the storage tank overflows to the sump 24 but the sump 24 does not overflow to the absorber 30, and at shutdown there is sufficient refrigerant stored in the storage tank 80 that, when it is drained to the sump 24 and overflows to the absorber, there is sufficient refrigerant to lower the concentration of solution in the absorber to prevent crystallization thereof. Also, at 80 percent load, the flow from the slot 86 will be such that it will be exceeded by the flow of refrigerant from the condenser such that the storage tank 80 will overflow to the sump 24.

Referring now to FIG. 3, the conventional system of FIG. 1 is now shown to include modifications to incorporate the above described refrigerant management apparatus into the system. As will be seen, rather than placing the refrigerant storage tank in the condenser, it is located in the evaporator. In doing so, with the condensed refrigerant passing to the storage tank 80 by way of the J-tube 85, there will be a tendency for some of the liquid refrigerant to flash to a vapor form as it passes into the tank. This will, in turn, complicate the relative volume relationship as discussed hereinabove. That is, if there is a liquid/vapor mixture passing to the storage tank 80, the volume of the two phase flow will be substantially greater than it would have been in a single phase form, thereby presenting the tank with a condition in which the volume is exaggerated for that particular operating condition. Accordingly, it is desirable to locate a liquid/vapor separator 90 in the circuit between the J-tube 85 and the storage tank 80. Any resulting refrigerant vapor can then be conducted along line 91 to the absorber 30, thereby leaving only liquid refrigerant to flow from the separator 90 to the storage tank 80.

As an alternative to the supplying of refrigerant from the condenser 70 to the storage tank 80 as described above, the storage tank 80 may be kept supplied with refrigerant by way of a line 93 (shown as the dotted line and FIG. 3) coming from the refrigerant discharge line 28. With this arrangement, the J- tube 85 and the liquid/vapor separator 90 can be eliminated and, although the feature of ensuring that there is sufficient refrigerant in the evaporator sump at part load, will no longer be available, the feature of diluting the solution at shutdown will operate in the same manner as described above.

Although preferred embodiments of the present invention have been illustrated and described, other changes will occur to those skilled in the art. For example, although the invention has been described with reference to a two-stage, series cycle of absorption cooling system, it could just as well have been described with reference to cooling systems of any of a variety of other types, including a single stage, parallel cycle system, among others.

What is claimed is:

1. In an absorption cooling machine of the type which uses a refrigerant and an absorbent and which includes a generator, a condenser, an evaporator including an evaporator sump and a refrigerant pump for pumping refrigerant from said evaporator sump, an absorber including an absorber sump and a solution pump for pumping a refrigerant-absorbent solution from said absorber sump, said evaporator sump and said absorber sump being separated by a partition, and means for interconnecting said generator, condenser, evaporator and absorber to form a closed of absorption cooling system, said cooling system further being of the type which operates at full or part load conditions and which is designed to shut down in accordance with a dilution cycle during which the quantity of refrigerant within the evaporator sump becomes large enough to overflow said partition and thereby reduce the concentration of the solution in said absorber sump to a value below that which crystallization occurs, an improved refrigerant management apparatus comprising:

a refrigerant storage tank located in a portion of said evaporator for receiving and storing liquid refrigerant;

means for causing the flow of refrigerant into said tank during operation of said absorption system; and tank drainage means with said tank fluidly communicating with said evaporator sump along a first flow path by way of an opening in a side of said tank and along a second flow path by way of overflowing said tank;

wherein the size of said opening and the relative volumes of said tank and said evaporator sump are such that at full load operations, the tank overflows to the evaporator sump but the evaporator sump does not overflow to the absorber, and at shutdown of the system, there is sufficient drainage of refrigerant from said opening to said evaporator sump, such that said evaporator sump overflows to said absorber with sufficient refrigerant as to lower the concentration of solution to prevent crystallization from occurring therein.

2. A refrigerant management apparatus as set forth in claim 1 wherein said refrigerant flow means comprises a fluid connection between said condenser and said storage tank.

3. The refrigerant management apparatus as set forth in claim 2 wherein said fluid connection comprises a J-tube which provides a liquid seal between the condenser and the evaporator.

4. A refrigerant management apparatus as set forth in claim 2, wherein the size of said opening and the volume of said evaporator sump are such that, at minimum load operating conditions, there is sufficient flow of refrigerant from the opening to the evaporator sump to prevent cavitation of said refrigerant pump.

5. A refrigerant management apparatus as set forth in claim 2, wherein the size of said opening and the size of said tank are such that, at 80 percent load operating conditions, said tank may overflow.

6. A refrigerant management apparatus as set forth in claim 1, wherein said opening is a vertical slot.

7. A refrigerant management apparatus as set forth in claim 6 wherein said slot extends to the bottom of said tank.

8. A refrigerant management apparatus as set forth in claim 2, and including a liquid/vapor separator between said condenser and said tank, said separator causing any resulting liquid to flow to said tank and any resulting vapor to flow to said absorber.

9. The refrigerant management apparatus as set forth in claim 1 wherein said refrigerant flow means comprises a fluid connection between said refrigerant pump and said storage tank.

10. In an absorption cooling machine of the type which uses a refrigerant and an absorbent and which includes a generator, a condenser, an evaporator including an evaporator sump and a refrigerant pump for pumping refrigerant from said evaporator sump, an absorber including an absorber sump and a solution pump for pumping a refrigerant- absorbent solution from said absorber sump, said evaporator sump and said absorber sump being separated by a partition, and means for interconnecting said generator, condenser, evaporator and absorber to form a closed of absorption cooling system, said cooling system further being of the type which operates at full or part load conditions and which is designed to shut down in accordance with a dilution cycle during which the quantity of refrigerant within the evaporator sump becomes large enough to overflow said partition and thereby reduce the concentration of the solution in said absorber sump to a value below that which crystallization occurs, an improved method of storing and releasing refrigerant comprising the steps of:

locating a refrigerant storage tank located in a portion of said evaporator for receiving and storing liquid refrigerant;

establishing liquid flow communication for causing the flow of refrigerant into said tank during periods of operation of said absorption system; and establishing liquid flow communication from said tank to said evaporator sump along a first flow path by way of an opening in a side of said tank and along a second flow path by way of overflowing said tank;

wherein the size of said opening and the relative volumes of said tank and said evaporator sump are such that at full load operations, the tank overflows to the evaporator sump but the evaporator sump does not overflow to the absorber, and at shutdown of the system, there is sufficient drainage of refrigerant from said opening to said evaporator sump, such that said evaporator sump overflows to said absorber with sufficient refrigerant as to lower the concentration of solution to prevent crystallization from occurring therein.

11. A refrigerant storage and releasing method as set forth in claim 1 wherein said liquid flow communication is established between said condenser and said storage tank.

12. The refrigerant storage and releasing method as set forth in claim 2 wherein said liquid flow communication is established by way of a J-tube which provides a liquid seal between the condenser and the evaporator.

13. A refrigerant storing and releasing method as set forth in claim 2, wherein the size of said opening and the volume of said evaporator sump are established such that, at minimum load operating conditions, there is sufficient flow of refrigerant from the opening to the evaporator sump to prevent cavitation of said refrigerant pump.

14. A refrigerant storing and releasing method as set forth in claim 2, wherein the size of said opening and the size of said tank are established such that, at 80 percent load operating conditions, said tank may overflow.

16. A refrigerant storing and releasing method as set forth in claim 2, and including the step of installing a liquid/vapor separator between said condenser and said tank, said separator causing any resulting liquid to flow to said tank and any resulting vapor to flow to said absorber.

16. A refrigerant storing and releasing method as set forth in claim 1, wherein said opening is a vertical slot.

17. A refrigerant storing and releasing method as set forth in claim 6 wherein said slot is extended to the bottom of said tank.

18. The refrigerant storing and releasing method as set forth in claim 1 wherein said liquid flow communication is established between said refrigerant pump and said storage tank.

* * * * *